US012787935B2

(12) United States Patent
Geurts

(10) Patent No.: US 12,787,935 B2
(45) Date of Patent: Nov. 10, 2026

(54) SHAKING DEVICE AND HARVESTING APPARATUS INCLUDING A SHAKING DEVICE

(71) Applicant: FINE FIELD B.V., Melderslo (NL)

(72) Inventor: Peter Johannes Lodewijk Geurts, Horst (NL)

(73) Assignee: FINE FIELD B.V., Melderslo (NL)

( * ) Notice: Subject to any disclaimer, the term of this patent is extended or adjusted under 35 U.S.C. 154(b) by 720 days.

(21) Appl. No.: 18/011,373

(22) PCT Filed: Jun. 18, 2021

(86) PCT No.: PCT/NL2021/050386
§ 371 (c)(1),
(2) Date: Dec. 19, 2022

(87) PCT Pub. No.: WO2021/256932
PCT Pub. Date: Dec. 23, 2021

(65) Prior Publication Data

US 2023/0232742 A1 Jul. 27, 2023

(30) Foreign Application Priority Data

Jun. 19, 2020 (NL) ..................................... 2025877

(51) Int. Cl.
*A01D 46/26* (2006.01)

(52) U.S. Cl.
CPC .................................. *A01D 46/264* (2013.01)

(58) Field of Classification Search
CPC .............. A01D 46/26; A01D 2046/262; A01D 46/264; A01D 2046/266; A01D 2046/268
See application file for complete search history.

(56) References Cited

U.S. PATENT DOCUMENTS 3,522,696 A 8/1970 Millier et al.
4,077,193 A 3/1978 Diggs
4,128,986 A * 12/1978 Santarelli ............... A01D 46/26 294/104

(Continued)

FOREIGN PATENT DOCUMENTS

EP 0930001 A1 * 7/1999 ........... A01D 25/046

OTHER PUBLICATIONS

International Search Report and Written Opinion, dated Sep. 7, 2021, for Application No. PCT/NL2021/050386, (15 pages).

*Primary Examiner* — Nicole Coy
(74) *Attorney, Agent, or Firm* — KDW Firm PLLC

(57) ABSTRACT

A shaking device for shaking a plant to harvest fruit carried by the plant. The shaking device includes a connecting frame for connecting the shaking device to a harvesting apparatus, a carrier for a shaker unit, displaceable in an oscillating manner, and a shaker unit connected to the carrier to engage with branches of the plant in order to shake the plant. The shaking device also includes a first mass driven by a first motor and a second mass driven by a second motor, and a transmission between the first and the second motor to couple the rotation of the first and the second motor. The first and the second motor are connected to the carrier, and the first and the second mass are eccentrically mounted on a respective axis of rotation to cause and transmit an oscillating movement upon rotation thereof. A harvesting apparatus including such a shaking device.

18 Claims, 7 Drawing Sheets

(56) References Cited

U.S. PATENT DOCUMENTS

| | | | | | |
|---|---|---|---|---|---|
| 4,891,955 | A * | 1/1990 | Klausing | F16F 15/067 62/297 |
| 5,473,875 | A | 12/1995 | Zehavi et al. | |
| 5,765,349 | A * | 6/1998 | Michelson | A01D 46/26 56/328.1 |
| 5,921,074 | A * | 7/1999 | Scott | A01D 46/28 56/330 |
| 6,672,044 | B1 | 1/2004 | Zehavi et al. | |
| 2002/0026780 | A1 * | 3/2002 | Orlando | A01D 46/26 56/328.1 |
| 2014/0109541 | A1 * | 4/2014 | Berthet | A01D 46/28 56/340.1 |
| 2016/0165797 | A1 * | 6/2016 | Palm | A01D 46/28 56/11.1 |
| 2017/0215341 | A1 * | 8/2017 | Stackhouse | A01D 46/26 |
| 2017/0339829 | A1 * | 11/2017 | Nielsen | G06F 3/04847 |

* cited by examiner

SHAKING DEVICE AND HARVESTING APPARATUS INCLUDING A SHAKING DEVICE

This application is a national stage filing under 35 U.S.C. 371 of pending International Application No. PCT/NL2021/050386, filed Jun. 18, 2021, which claims priority to Netherlands Patent Application No. 2025877, filed Jun. 19, 2020, the entirety of which applications are incorporated by reference herein.

The invention relates to a shaking device for shaking a plant in order to harvest fruit hanging from the plant, wherein the shaking device comprises a mounting frame for mounting the shaking device on a harvesting apparatus, a carrier for at least one shaking member, which is displaceable relative to the mounting frame in order to be able to perform a vibrating movement relative to the mounting frame, and at least one shaking member which is attached to the carrier and can be arranged alongside branches of the plant in order to shake the plant by transmitting the vibrating movement to the branches.

Such a shaking device is known from U.S. Pat. No. 4,982,558, which shows that the carrier is driven relative to a frame. In order to compensate for the vibrations created therein, two eccentrically rotating masses are arranged on the frame. Rotation of the eccentrically rotating masses is coupled to the drive of the carrier such that the rotating masses cause an effect opposite to said vibrations, whereby the frame should be substantially vibration-free.

Although the device from U.S. Pat. No. 4,982,558 can function adequately once a sufficiently high rotation speed has been reached, it has been found in practice that in use of the device at a low rotation speed, such as when the device is starting up and stopping, the masses compensate insufficiently for the vibrations. The device as a whole thereby vibrates a great deal, whereby use at a low rotation speed is unfavourable. A low rotation speed is however desired for harvesting determined types of fruit, for instance determine types of berry. The device of U.S. Pat. No. 4,982,558 is in practice otherwise driven by a heavy diesel engine which is mounted on the frame, whereby starting up and stopping are relatively time-consuming. There is therefore a desire to improve the device known from U.S. Pat. No. 4,982,558.

The invention therefore has for its object to improve the known device, particularly by providing a device which can be used particularly at relatively low rotation speeds.

This object is achieved with a shaking device of the type stated in the preamble, wherein the shaking device comprises:

- a first motor and a first mass connected to the first motor, wherein the first motor is configured to drive the first mass rotatingly in a first rotation direction;
- a second motor and a second mass connected to the second motor, wherein the second motor is configured to drive the second mass rotatingly in a second rotation direction opposite to the first rotation direction; and
- a transmission between the first motor and the second motor for coupling rotation of the first motor to rotation of the second motor, wherein the first motor and the second motor are connected to the carrier and wherein the first and the second mass are each mounted eccentrically on a respective rotation shaft so as to cause during rotation a vibrating movement and transmit it to the carrier.

The shaking device operates in that the eccentrically mounted masses cause a reaction force during the rotation. The reaction force is transmitted via the motors to the carrier, which is thereby actuated into a vibrating movement. The use of two masses provides the option of synchronizing rotation of the two masses with each other such that a reaction force of the first mass in a first direction is cancelled out by the reaction force of the second mass, and a reaction force of the first mass in a second, different direction is conversely intensified by the reaction force of the second mass.

The vibrating movement is then transmitted by means of the shaking member to a plant by positioning the shaking member vibratingly close to the plant. The plant is shaken by contact with the vibrating shaking member, whereby fruit hanging from the plant detaches therefrom and falls. It is for instance possible to envisage catching the falling fruit. Alternatively, if desired, the fruit can be allowed to fall to the ground to be picked up later.

Because two motors are provided in the shaking device, use can be made of relatively small motors. Since two separate motors are provided for two masses, use can for instance be made of commercially available unbalance motors.

The transmission provides for the coupling of the two motors so that they remain synchronized. It is noted here that, because they are both connected to the carrier, the two motors tend to synchronize according to Huygens' synchronization principle. The transmission need thereby only be embodied sufficiently rigidly to be able to correct small variations relative to a synchronized status, for instance when the motors are starting up or stopping. In particular, it is not necessary to drive one of the masses wholly via the transmission, as would be the case if only one motor were provided to drive both masses. Owing to the less stringent requirements for the transmission, it can be lighter and/or entail lower material costs.

By coupling the rotations of the motors, the motors are synchronized, irrespective of the rotation speed of the motors. They are hereby at least substantially in sync, even at relatively low rotation speeds. The shaking device can hereby also be used at such low rotation speeds, which can be desirable in the harvesting of for instance berries which detach from their bush relatively easily and therefore need to be shaken less firmly. The rotation speed of the motors can be adjustable so that a suitable shaking intensity can be selected depending on the type of fruit to be harvested.

The first and second masses can each be mounted on a rotation shaft of respectively the first and second motor. It is hereby not necessary to bearing-mount the masses separately of the motors. An additional transmission between motor and mass is not necessary either. The shaking members can be configured to be struck against fruit-bearing branches, for instance by a repetitive movement of the shaking members. Such shaking members are generally referred to as beaters because they beat against the branches in order to shake the branches and thereby cause the fruit to fall. Such shaking members must be clearly distinguished from the type which engages on for instance a trunk or branch, fixedly camps it and imposes a displacement in order to cause shaking of the branch or trunk. A notable difference is for instance that a driving of two clamps relative to each other is necessary for clamping a trunk or branch. In the case of shaking members described in this application the movement of the shaking members relative to the mounting frame is however wholly determined by the movement of the carrier. For this reason the shaking members can be connected to the carrier in stationary or rigid manner.

The shaking members can for instance have a determined flexibility which is chosen such that, when displaced, they perform a whipping movement and thereby 'beat' against fruit-bearing branches. It will be apparent that a so chosen flexibility makes it impossible to clamp a branch or trunk between the shaking members in order to impose a displacement thereon.

The shaking device can for instance be provided with a shaking tree, for instance of the type comprising a substantially vertically disposed rod as carrier and a plurality of shaking members extending radially outward from the rod at different angular positions and different heights.

The respective first and second mass can each be embodied as two separate mass parts which are each arranged on a longitudinal end zone of their respective rotation shaft. The first and second motor can for this purpose comprise a continuous rotation shaft on which a mass part is arranged on either side, and a drive placed between the mass parts. With such a construction the mass parts co-act in order to cause a reaction vibration which acts on a central part of the motor.

In an embodiment of the shaking device the first motor and second motor are mounted directly on the carrier.

By mounting the motors directly on the carrier no or fewer vibrations are transmitted from the motors to the mounting frame. The frame is hereby loaded less, and it is not necessary to compensate for such vibrations. It is noted that the relatively small motors of the shaking device are highly suitable for being mounted directly on the carrier. Such small motors can for instance be electric motors.

The direct connection between the motors and the carrier can be defined as a rigid mechanical connection without interposing of the mounting frame.

In an embodiment of the shaking device the rotation shafts of the first motor and the second motor are substantially parallel.

By arranging the rotation shafts in parallel manner the rotating masses cause reaction vibrations which are mutually parallel. A relatively large part of the reaction vibrations of one mass can thereby be compensated for or intensified by the reaction vibrations of the other mass. In this embodiment the motors can also be coupled to each other in relatively simple manner by means of the transmission.

In an embodiment of the shaking device the rotation shafts of the first motor and the second motor lie substantially at right angles to a longitudinal direction of the carrier.

In this embodiment the reaction vibrations of each mass are at least partially generated in the longitudinal direction of the carrier. The mass can thereby be set into vibration in its longitudinal direction.

This embodiment is particularly advantageous when the carrier is disposed substantially vertically during use, because vertical vibrations can be used to harvest for instance berries without doing a great deal of damage to the berries. This embodiment is thereby highly suitable for harvesting berries which are for instance suitable for consumer sales. It is noted that horizontal vibrations during harvesting of berries may result in more damage to the berries, whereby only horizontal vibrations are more suitable for harvesting of berries intended for industrial processing.

It is noted that the rotation shafts of the motors can be the same as the rotation shafts of the respective masses, or can lie mutually in line and can be coupled rotatably.

In an embodiment of the shaking device the first mass and the second mass are arranged on either side of a centre of the carrier, as seen in a direction at right angles to the respective rotation shaft. A central axis of the carrier can for instance be deemed the centre. The carrier can for instance be placed halfway between the masses and/or the motors.

In this way the one mass can partially or wholly cancel out a force caused by the other mass in a first direction and intensify it in another direction, whereby substantially translating vibrations remain in said other direction. Said other direction can be parallel to the longitudinal axis of the carrier.

In an embodiment of the shaking device the first mass and the second mass are arranged staggered relative to each other in the longitudinal direction of their respective rotation shaft.

By arranging the masses in staggered manner in the longitudinal direction of their respective rotation shaft a moment about an axis at right angles to said longitudinal direction, for instance an axis parallel to the longitudinal direction of the carrier, results during rotation of the masses. Such a moment provides for an, optionally small, rotating vibrating movement of the carrier, whereby the shaking member undergoes a more complex vibration. The shaking member hereby particularly also shakes in horizontal direction when the carrier is disposed vertically during use. Such a horizontal vibration contributes to an increase in effectiveness of the shaking device.

It is also noted that a purely horizontal vibration can cause a relatively large amount of damage to the fruit or plants to be harvested, but that a combination of vertical and horizontal vibrations has been found particularly suitable in the harvesting of berries. Such a combination can be achieved by arranging the masses in staggered manner in the longitudinal direction of their rotation shafts, wherein the rotation shafts are parallel and lie at right angles to a longitudinal direction of the carrier, and the masses are arranged on either side of the carrier, as seen in a direction at right angles to their respective rotation shaft. Such an embodiment is a combination of claims 3-6.

In an embodiment of the shaking device the first and second motor are arranged at a substantially identical position, as seen in a longitudinal direction of the carrier.

In this embodiment the motors together take up relatively little space in the longitudinal direction, whereby the shaking device can take a more compact form.

In an embodiment of the shaking device the rotation phases of the first mass and the second mass differ such that during rotation the first mass and the second mass perform an opposite movement along a first direction and perform the same movement along a second direction, this being perpendicular of the first direction.

In this way reaction vibrations of the masses cancel each other out at least largely in the first direction, while intensifying each other in the second direction. Rotating, eccentric masses can therefore be used to collectively cause a substantially linear reaction vibration. As explained above, the linear reaction vibration can be expanded by applying a moment, for instance by arranging the masses in staggered manner.

In an embodiment of the shaking device the at least one shaking member is rotatable about a longitudinal axis of the carrier.

When the shaking member is rotatable about the longitudinal axis of the carrier, the carrier can be moved, for instance vertically, along bushes during harvesting. The shaking member can here come into contact with the bushes. While the carrier is being displaced along the bushes, the shaking member can here rotate about the carrier and so co-displace partially with the displacement of the bush relative to the carrier. The shaking member thus maintains contact with the bush for a relatively long time, and the chance of damage to the bush is reduced.

In an embodiment of the shaking device the carrier is suspended with one side from the mounting frame.

By suspending the carrier on one side the carrier is able to move in more degrees of freedom relative to the frame. One-sided mounting further limits the number of vibrations transmitted from the carrier to the mounting frame in that the vibrations can only reach the mounting frame through the one-sided mounting. The one-sided mounting can for instance be equipped with means for preventing transmission of vibrations.

The one-sided suspension can further provide the advantage of being easily releasable, for instance for replacing or removing the shaking device.

By suspending the shaking device on one side a connection is formed between the shaking device and the mounting frame on an upper side of the shaking device. If a mounting were arranged on the underside of the shaking device, as is known from the prior art, parts of bushes, such as branches or stalks, can become stuck in the mounting or between the mounting and the shaking device. This may cause damage to these branches or stalks. By arranging the suspension only on the upper side this risk is avoided.

In an embodiment of the shaking device the carrier is connected to the mounting frame by means of a spring.

The spring can be used to give the carrier sufficient freedom of movement, particularly in the longitudinal direction of the carrier, and optionally in one or more rotation directions. The spring helps prevent the transmission of vibrations from the carrier to the mounting frame.

The spring also enables the shaking device to move relative to the mounting frame in a direction parallel to the longitudinal direction of the spring, such as the vertical direction, without having to move in other directions. In this, the shaking device differs greatly from the prior art, where each vertical displacement entails a horizontal component due to a parallel frame.

The shaking device can comprise one or more stops for limiting the displacement range of the shaking device relative to the mounting frame. The stops can for instance be hydraulic stops in order to prevent a relatively large amount of vibrations from resulting when the displacement range is exceeded.

In an embodiment of the shaking device the spring is a compression spring and the carrier rests on the compression spring.

Allowing the carrier to rest on a compression spring makes it possible to select a compression spring of a suitable length and/or stiffness. The compression spring can particularly extend at least partially or wholly in and/or along the carrier, whereby a relatively long compression spring with a relatively low spring constant can be selected. Such a slack spring helps prevent transmission of vibrations to the mounting frame.

In an embodiment of the shaking device the carrier is bearing-mounted for rotation about a longitudinal axis of the carrier relative to the mounting frame.

By bearing-mounting the carrier rotatably the above stated rotatability of the shaking member around the longitudinal axis of the carrier can be achieved. The carrier can be provided with a sliding contact at the position of the mounting of the carrier on the mounting frame, by means of which the motors can be powered. From the sliding contact, an electricity line can extend through the carrier to one or both of the motors.

In an embodiment of the shaking device the carrier is bearing-mounted for displacement in a longitudinal direction of the carrier relative to the mounting frame.

By bearing-mounting the carrier for displacement in the longitudinal direction it can move along its longitudinal axis, for instance in order to allow a vertical vibration of the shaking member.

In an embodiment of the shaking device the carrier is connected to the mounting frame by means of a ball-bearing cage which allows rotation about and displacement along the longitudinal axis of the carrier.

Such a ball-bearing cage can allow the desired rotation and translation, while other displacements are precluded. A ball-bearing cage can take a relatively compact form and/or be purchased cost-effectively and/or be sufficiently strong. A ball-bearing cage can comprise two concentrically placed sleeves separated from each other by balls at different angular positions all around a longitudinal axis of the sleeves and at different positions along the longitudinal axis of the sleeves.

In an embodiment of the shaking device the first and the second motor are arranged on a side of the carrier directed toward the mounting frame.

In this embodiment the carrier can be suspended from the mounting frame and be directed substantially vertically downward. By arranging the motors on the mounting frame side the motors are placed on the upper side of the carrier. The carrier can thereby extend to a position close to the ground, and the shaking members can therefore also extend close to the ground. A bush, for instance a berry bush, can thereby be shaken over substantially its whole length in order to harvest fruit from this bush.

The invention also relates to a harvesting apparatus for harvesting fruit hanging from a plant, comprising at least one shaking device according to at least one of the foregoing claims and a catching device for catching fruit falling from the plant due to shaking of the plant by means of the at least one shaking device.

Such a harvesting apparatus can be used to harvest fruit hanging from a plant by shaking the fruit from the plant by means of the shaking device. The fruit can then be caught using the catching device. A harvesting apparatus can for instance comprise a gantry which can travel over a row of bushes. Fruit can thus be harvested from successive bushes from a row.

The harvesting apparatus can for instance comprise two of said shaking devices, the carriers of which are disposed substantially parallel to each other. The shaking devices can thus be arranged on either side of a bush and shake at least almost all the stalks of a bush, and thereby harvest as much fruit as possible.

The harvesting apparatus can otherwise take a mobile form, even when use is not made of the mobile gantry.

In an embodiment of the harvesting apparatus the at least one shaking device is placed in the centre of the harvesting apparatus, as seen in the direction of travel.

By placing the shaking device in the centre the harvesting apparatus can be used both in the direction of travel and a direction opposite to the direction of travel.

In an embodiment of the harvesting apparatus the harvesting apparatus comprises a frame for mounting the shaking device thereon, and the at least one shaking device is displaceable relative to the frame in a direction transversely of the direction of travel.

By displacing the shaking device in the transverse direction fruit on bushes of different widths can be harvested, or fruit on bushes positioned offset in the transverse direction over a determined distance can be harvested without having to displace the harvesting apparatus in the transverse direction. This is because it is possible instead to displace only the shaking device.

The invention will be further elucidated hereinbelow with reference to the accompanying figures, in which:

FIG. 1 shows schematically a perspective view of a prior art harvesting apparatus, without shaking device;

FIGS. 2A and 2B each show schematically a different perspective view of a harvesting apparatus with two shaking devices;

The same elements are designated in the figures with the same reference numerals.

Figure 1:
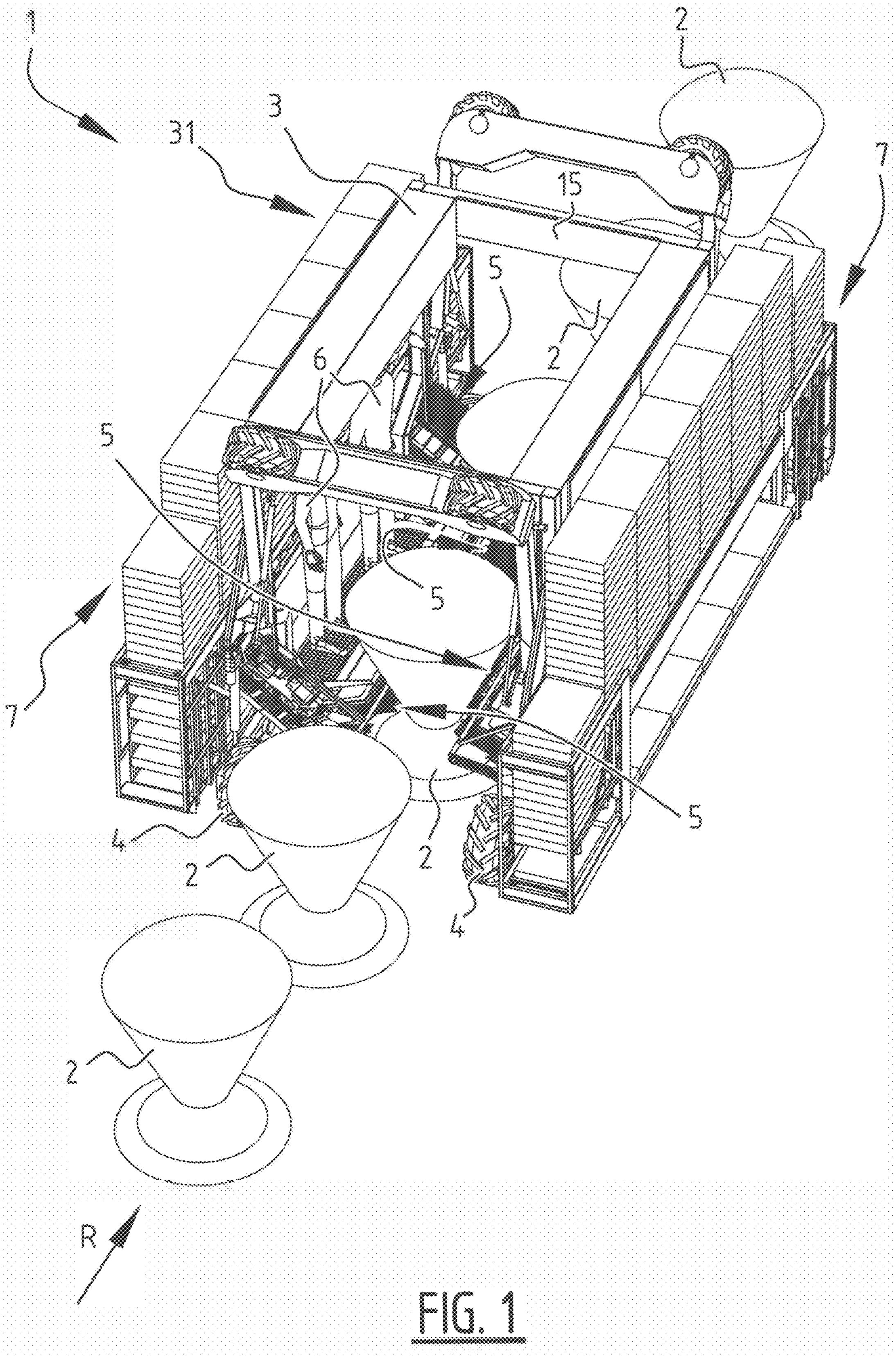
FIG. 1 (Prior Art)

FIG. 1 shows a per se known harvesting apparatus 1 for harvesting fruit hanging from a plant 2. The shown harvesting apparatus 1 can for instance be used to harvest berries. Berries grow on bushes 2 consisting of a number of stalks extending upward from the ground. The stalks are substantially vertical. Harvesting apparatus 1 has a gantry formed by a frame 3. Frame 3, and thereby harvesting apparatus 1, is mobile in that wheels 4 are arranged. Wheels 4 define a direction of travel R of harvesting apparatus 1. The plants 2 from which the fruit must be harvested are generally arranged in rows. A plurality of plants 2 can be reached in succession by harvesting apparatus 1 by displacing harvesting apparatus 1 over one of the plants 2 and then placing it with the direction of travel R corresponding to the longitudinal direction of a row of plants 2. Harvesting apparatus 1 can thus travel over each plant 2 in the row.

Harvesting apparatus 1 has a number of catchers 5 which are situated under plant 2 during harvesting. Harvesting apparatus 1 further provides space for workers 6. The workers 6 shake the plants 2 manually or with a stick intended for this purpose when they pass, whereby fruit detaches from the plant and falls onto catchers 5. Catchers 5 then carry the fruit away to a crate system 7.

Figure 2A:
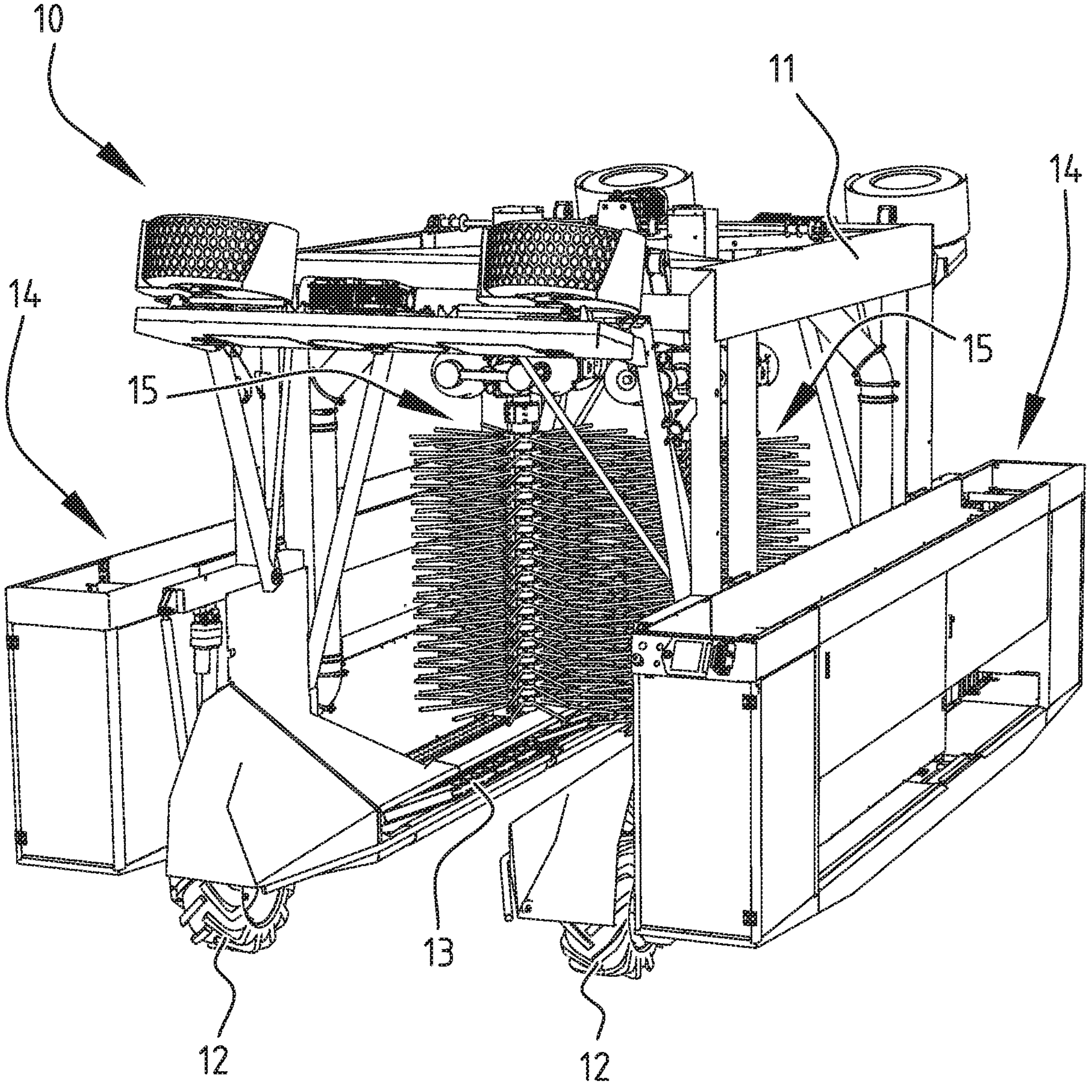
Figure 2B:
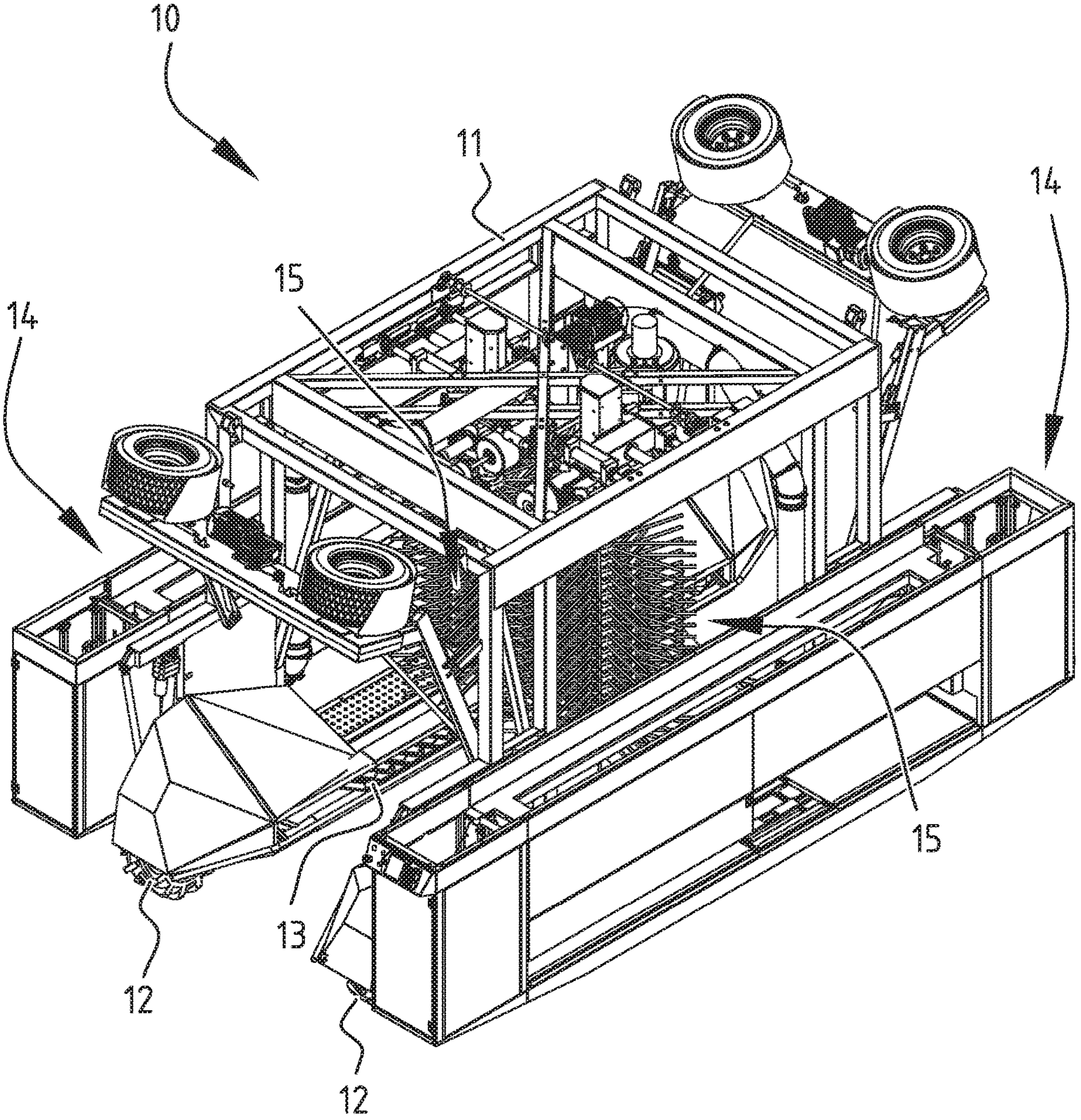
Figure 3:
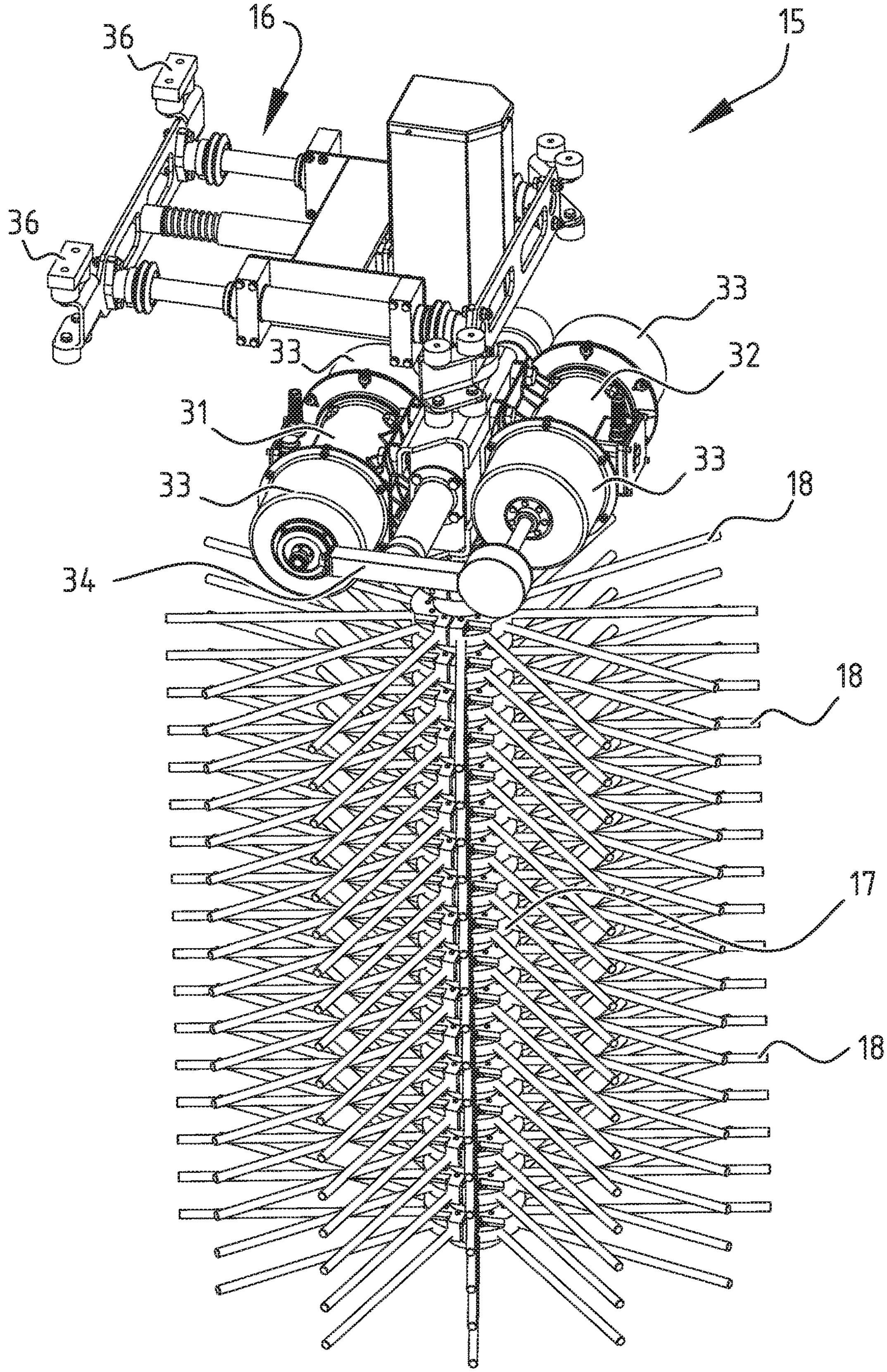
FIG. 3 shows schematically a perspective view of a shaking device of FIGS. 2A and 2B.
Figure 4:
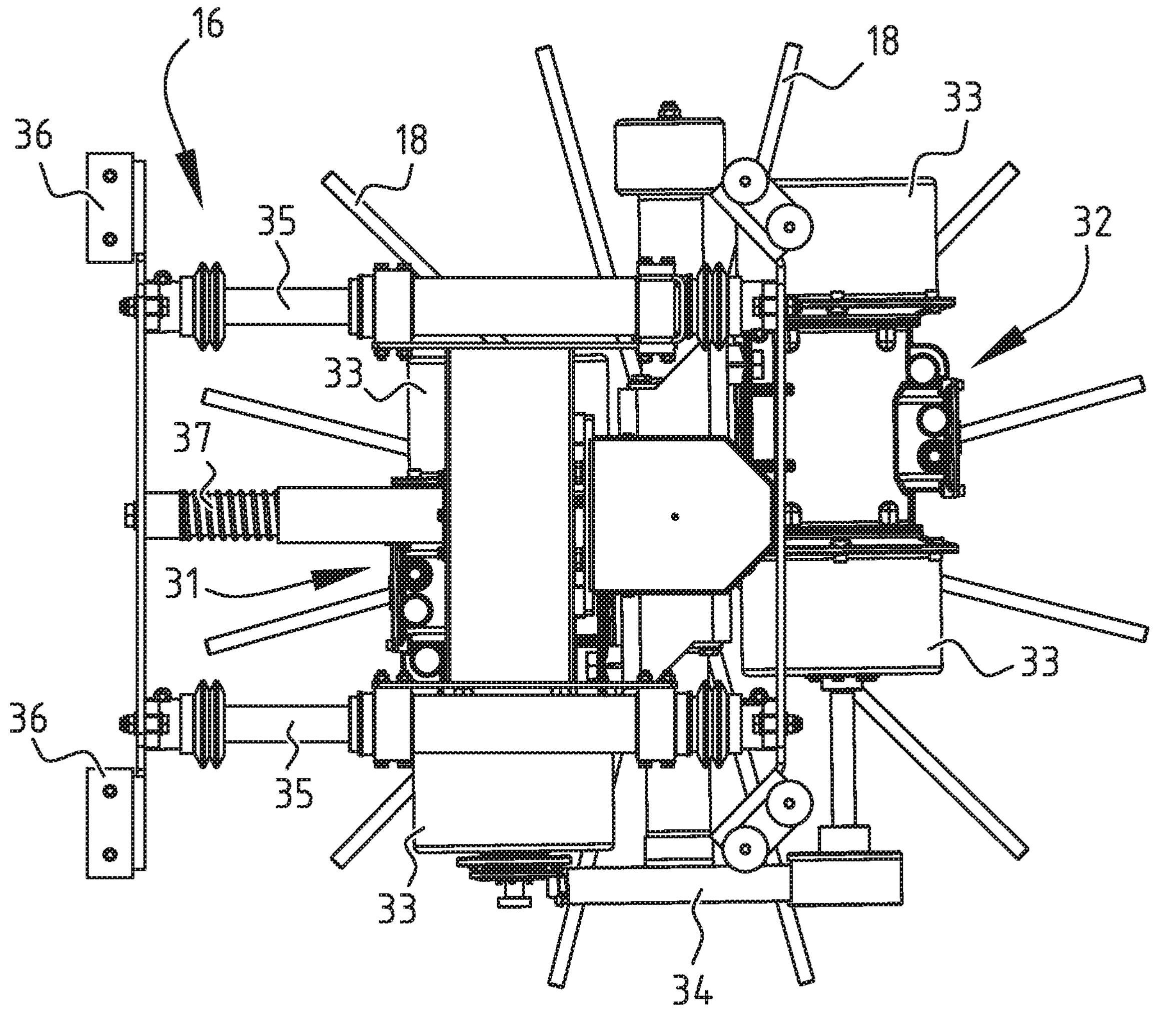
FIG. 4 shows schematically a top view of the shaking device of FIG. 3.
Figure 5:
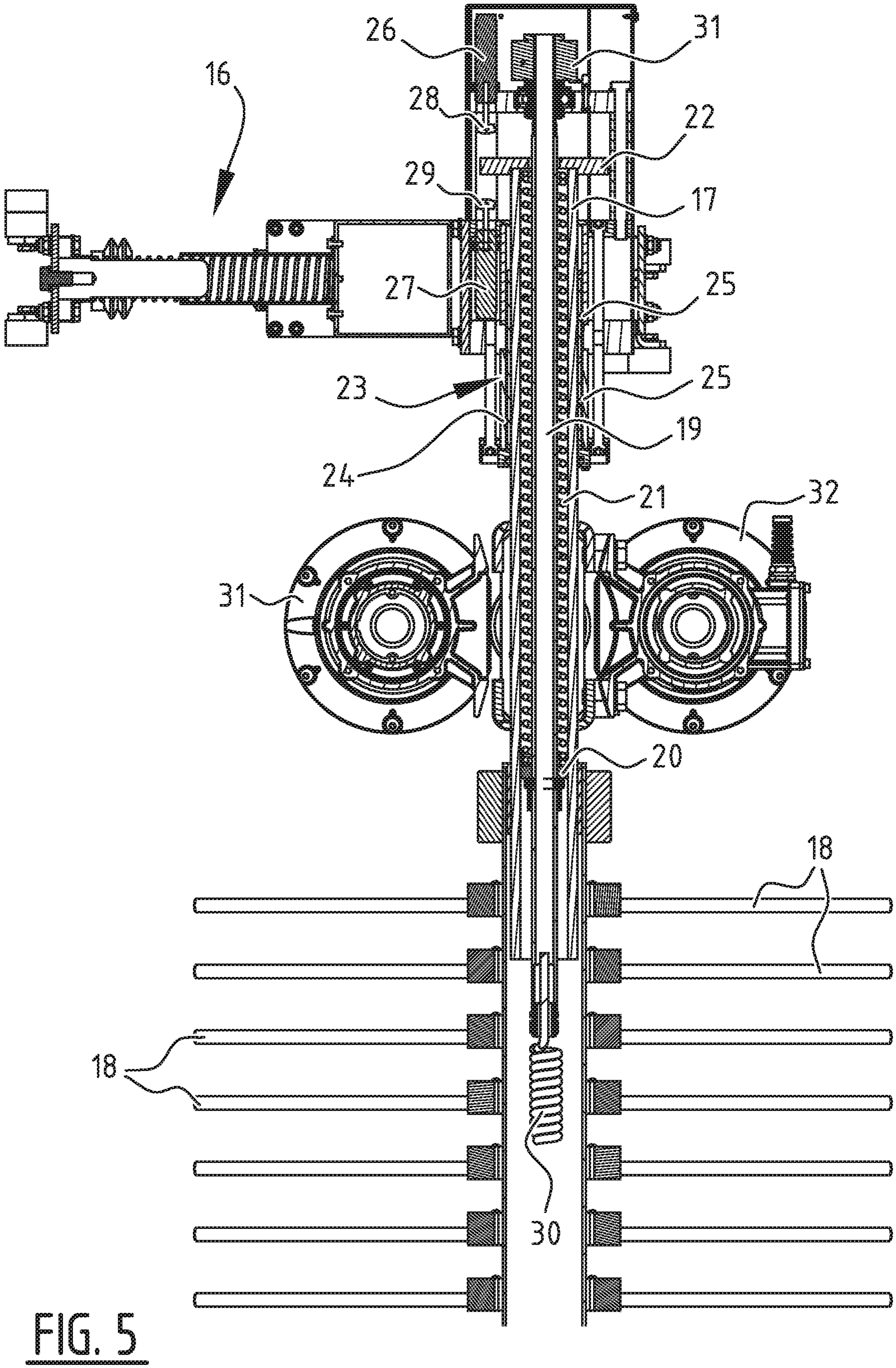
FIG. 5 shows schematically a vertical cross-section of the shaking device of FIGS. 3 and 4.

FIGS. 2A and 2B show a similar harvesting apparatus 10. The harvesting apparatus also has a frame 11 which forms a gantry and can travel by means of wheels 12. Harvesting apparatus 10 further has catchers 13 for catching fruit and a crate system 14 for storing fruit after it has been caught. Harvesting system 10 of FIGS. 2A and 2B does not however provide any space for workers. Instead, harvesting apparatus 10 is provided with two shaking devices 15. Details of the shaking devices 15 are shown in FIGS. 3-5. Shaking devices 15 all take the same form, and are therefore discussed below in the singular.

Shaking device 15 has a mounting frame 16 whereby shaking device 15 can be mounted on frame 11 of harvesting apparatus 10. Shaking device 15 further has a carrier 17 with shaking members (beaters) 18 thereon. Shown shaking device 15 is provided with a so-called shaking tree, with a trunk formed by carrier 17 and branches formed by shaking members 18. Carrier 17 is embodied as a hollow tube Shaking members 18 extend radially from carrier 17 and are attached to carrier 17 at different heights and different angular positions. Carrier 17 is rotatable about its longitudinal axis relative to mounting frame 16. The longitudinal axis of the carrier corresponds to its central axis. When harvesting apparatus 10 travels over a row of plants 2, shaking members 18 thereby co-rotate with the displacement of plants 2. Shaking members 18 herein come into contact with plants 2, for instance the stalks thereof. Shaking members 18 are moved as described below, and impart here a vibrating movement to plants 2. Shaking members 18 thereby shake the plants 2, whereby fruit falls from the plants and can be caught Shaking device 10 is thereby a suitable replacement for workers 6. Mounting frame 16 has two extendable arms 35 which extend from mounting points 36 for frame 11 of harvesting apparatus 10. Carrier 17 is connected to arms 35 and is urged away from mounting points 36 by means of a spring 37. Carrier 17 can be placed closer to and/or further away from mounting points 36 by adjusting the length of arms 35. Shaking device 15 is hereby displaceable relative to frame 11 of harvesting apparatus 10 in a direction transversely of the direction of travel R.

In order to be able to set shaking members 18 into a vibrating movement the carrier is suspended displaceably relative to mounting frame 16. For this purpose mounting frame 16 comprises a rod 19 (see FIG. 5) which is disposed vertically during use. Rod 19 is provided at its end with a thickened head 20 on which a compression spring 21 rests. Compression spring 21 extends upward from the head 20 of rod 19, around rod 19. A flange 22 to which carrier 17 is attached rests on the upper end of spring 21. Carrier 17 can move up and downward over rod 19, and so along its own longitudinal axis, by compression and extension of spring 21. Spring 21 extends in carrier 17 and can therefore be relatively long without shaking device 15 having to take a particularly high form. Carrier 17 is bearing-mounted relative to the mounting frame using a ball-bearing cage which allows rotation about the longitudinal axis of carrier 17 but also allows the displacement in the longitudinal direction of carrier 17. The ball-bearing cage 23 has an outer sleeve 24 and an inner sleeve. The inner sleeve is formed by carrier 17. Balls 25, which guide the rotation and translation of carrier 17 relative to the outer sleeve 24, are arranged between the two sleeves 17, 24. Mounting frame 16 further has two hydraulic dampers 26, 27, each with a buffer head 28, 29 serving as stop for the flange 22 of carrier 17. The dampers 26, 27 bound the maximum displacement of carrier 17. An electricity line 30 runs from a sliding contact 31 downward through rod 19, and there exits through carrier 17. Electricity line 30 then runs to a first motor 31 and a second motor 32, which will be discussed further hereinbelow.

Motors 31, 32 are both mounted directly on carrier 17 and thus always co-displace with carrier 17, and vice versa. Each of the motors 31, 32 is an electric motor with a continuous shaft. Arranged on either side of each motor 31, 32 is a cover 33 (see FIG. 4). A mass part M1', M2' is in each case situated under the cover 33 (see FIGS. 6A-6D). Each mass part M1', M2' forms together with the mass part M1', M2' of the same motor 31, 32 a mass M1, M2 which is mounted eccentrically on rotation shaft 51, 52 of motor 31, 32. During use the motors 31, 32 rotate about their rotation shafts 51, 52, and thereby therefore the corresponding masses M1, M2. Because the masses M1, M2 are mounted eccentrically, this results in reactive vibrations which are transmitted via motors 31, 32 to carrier 17. Motors 31, 32 have opposite rotation directions and are mutually coupled by means of a transmission 34. The transmission 34 ensures that the first and second motor rotate at substantially the same speed and that any small variations are compensated for, whereby a first determined position of the first motor 31 always corresponds with the same second determined position of the second motor 32. Transmission 34 thus synchronizes the motors 31, 32.

Referring to FIGS. 6A-6D, it is explained how motors 31, 32 are used to achieve a vibrating movement of carrier 17. For this purpose the rotation shaft 51 of first motor 31 and the rotation shaft 52 of second motor 32 is in each case shown in both side view (top) and top view (bottom). A part of carrier 17 is shown schematically as a line. Each of the figures shows the first mass M1 and the second mass M2. The masses M1, M2 each consist of mass parts M1', M2'. The first motor 31 rotates in clockwise direction and the second motor 32 rotates in counter-clockwise direction. FIGS. 6A-6D differ from each other only in that the masses M1, M2 are situated at a different point in a revolution.

Figure 6A:
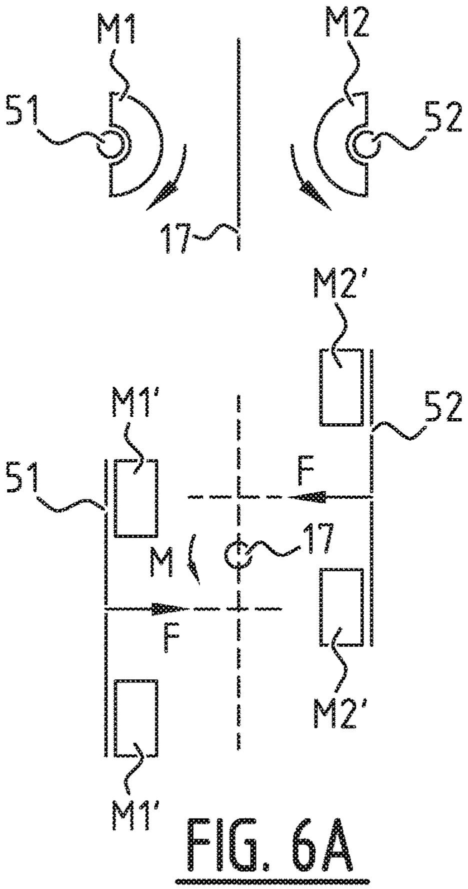
FIGS. 6A-6D show highly schematically how a vibration is generated by the shaking device of FIG. 3-5.

In FIG. 6A the masses M1, M2 are directed toward each other. The two masses M1, M2 thereby move downward, whereby an inward-directed reaction force F is generated. No vertical or horizontal reaction force thereby results in the side view, because the displacements of the masses M1, M2 are opposite. In the top view a reaction force F, which is directed inward, is shown for each mass M1, M2. Because the masses M1, M2 are staggered relative to each other in longitudinal direction of their rotation shafts 51, 52, they each have an arm relative to carrier 17. Due to the reaction forces F, this results in a moment M about the longitudinal axis of carrier 17 which is directed counter-clockwise.

Figure 6B:
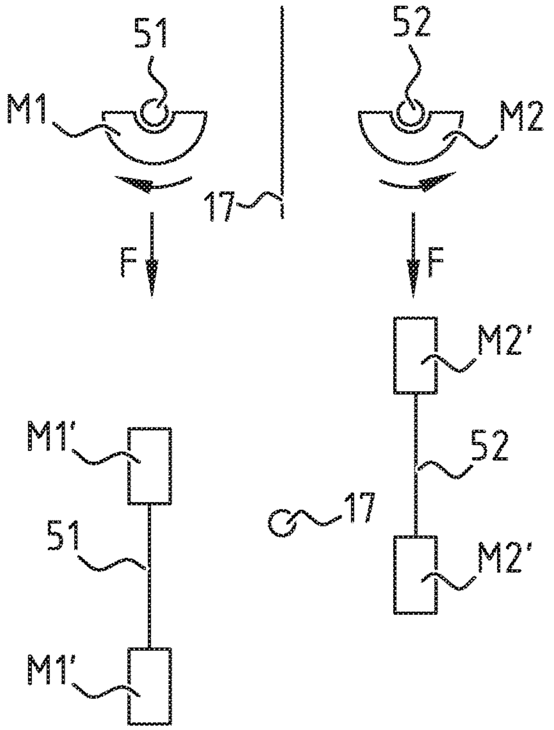

In FIG. 6B the masses M1, M2 are directed downward. The masses M1, M2 thereby move outward, which generates a vertically downward reaction force F.

Figure 6C:
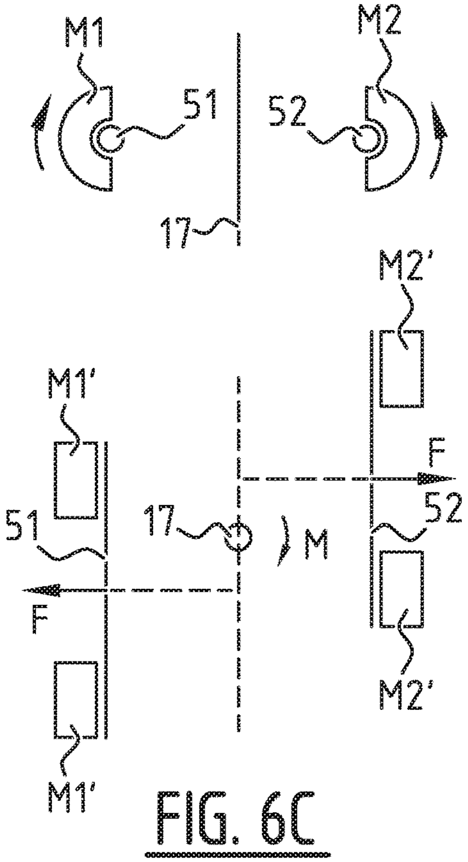
Figure 6D:
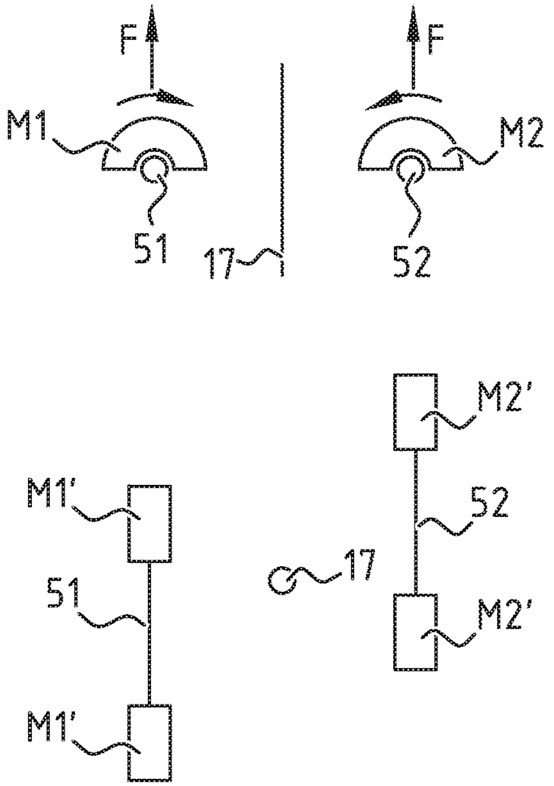

In FIG. 6C the masses M1, M2 are directed away from each other. The two masses M1, M2 thereby move upward, whereby an outward-directed reaction force F is generated. No vertical or horizontal reaction force thereby results in the side view, because the displacements of the masses M1, M2 are opposite. In the top view a reaction force F, which is directed outward, is shown for each mass M1, M2. Because the masses M1, M2 are staggered relative to each other in longitudinal direction of their rotation shafts 51, 52, they each have an arm relative to carrier 17. Due to the reaction forces F, this results in a moment M about the longitudinal axis of carrier 17 which is directed clockwise.

When the masses rotate a vertically directed force is thus created, which acts alternatingly in upward and in downward direction, and a moment about the longitudinal axis of carrier 17 which acts alternatingly in clockwise and in counter-clockwise direction.

This force and this moment are transmitted by motors 31, 32 to carrier 17, whereby it is set both into vibration in the vertical direction along its longitudinal axis and in rotation about its longitudinal axis. The free ends of shaking members 18 thereby move in both vertical and horizontal direction relative to a plant 2, and thereby travel a substantially circular path.

Although the invention is elucidated above on the basis of a number of specific examples and embodiments, the invention is not limited thereto. The invention instead also covers the subject matter defined by the following claims.

The invention claimed is:

1. A shaking device for shaking a plant in order to harvest fruit hanging from the plant, wherein the shaking device comprises:

- a mounting frame for mounting the shaking device on a harvesting apparatus;
- a carrier for at least one shaking member, which is displaceable relative to the mounting frame in order to be able to perform a vibrating movement relative to the mounting frame, the carrier having a vertically directed longitudinal axis and being bearing-mounted for rotation about its longitudinal axis relative to the mounting frame;
- a plurality of shaking members which are attached to and extend radially outward from the carrier and which can be arranged alongside branches of the plant in order to shake the plant by transmitting the vibrating movement to the branches, the shaking members being rotatable about the longitudinal axis of the carrier while the carrier is displaced along the plant;
- a first motor and a first mass connected to the first motor, wherein the first motor is configured to drive the first mass rotatingly in a first rotation direction;
- a second motor and a second mass connected to the second motor, wherein the second motor is configured to drive the second mass rotatingly in a second rotation direction opposite to the first rotation direction; and
- a transmission between the first motor and the second motor for coupling rotation of the first motor to rotation of the second motor, wherein the first motor and the second motor are connected to the carrier and wherein the first mass and the second mass are each mounted eccentrically on a respective rotation shaft and are arranged staggered relative to each other in the longitudinal direction of their respective rotation shaft so as to cause during rotation a rotating vibrating movement and transmit it to the carrier.

2. The shaking device according to claim 1, wherein the first motor and the second motor are mounted directly on the carrier.

3. The shaking device according to claim 1, wherein the rotation shafts of the first motor and the second motor are substantially parallel.

4. The shaking device according to claim 3, wherein the rotation shafts of the first motor and the second motor lie substantially at right angles to a longitudinal direction of the carrier.

5. The shaking device according to claim 1, wherein at least one of:

- the first mass and the second mass are arranged on either side of a centre of the carrier, as seen in a direction at right angles to the respective rotation shaft, and
- the first and second motor are arranged at a substantially identical position, as seen in a longitudinal direction of the carrier.

6. The shaking device according to claim 1, wherein the rotation phases of the first mass and the second mass differ such that during rotation the first mass and the second mass perform an opposite movement along a first direction and perform the same movement along a second direction, this being perpendicular of the first direction.

7. The shaking device according to claim 1, wherein said shaking members are arranged at different angular positions about the longitudinal axis of the carrier.

8. The shaking device according to claim 1, wherein said shaking members are connected to the carrier at different positions in a longitudinal direction of the carrier.

9. The shaking device according to claim 1, wherein the carrier is suspended with one side from the mounting frame.

10. A shaking device for shaking a plant in order to harvest fruit hanging from the plant, wherein the shaking device comprises:

- a mounting frame for mounting the shaking device on a harvesting apparatus;
- a carrier for at least one shaking member, which is displaceable relative to the mounting frame in order to be able to perform a vibrating movement relative to the mounting frame, the carrier including a vertically disposed rod or tube;

a plurality of shaking members which are attached to and extend radially outward from the carrier and which can be arranged alongside branches of the plant in order to shake the plant by transmitting the vibrating movement to the branches, the shaking members being rotatable about a longitudinal axis of the carrier;

a first motor and a first mass connected to the first motor, wherein the first motor is configured to drive the first mass rotatingly in a first rotation direction;

a second motor and a second mass connected to the second motor, wherein the second motor is configured to drive the second mass rotatingly in a second rotation direction opposite to the first rotation direction; and a transmission between the first motor and the second motor for coupling rotation of the first motor to rotation of the second motor, wherein the first motor and the second motor are connected to the carrier and wherein the first and the second mass are each mounted eccentrically on a respective rotation shaft so as to cause during rotation a vibrating movement and transmit it to the carrier, and wherein the carrier is connected to the mounting frame by means of a spring, said spring being a compression spring and the carrier resting on the compression spring.

11. The shaking device according to claim 1, wherein the carrier is bearing-mounted for displacement in a longitudinal direction of the carrier relative to the mounting frame.

12. The shaking device according to claim 11, wherein the carrier is connected to the mounting frame by means of a ball-bearing cage which allows rotation about and displacement along the longitudinal axis of the carrier.

13. A shaking device for shaking a plant in order to harvest fruit hanging from the plant, wherein the shaking device comprises:

a mounting frame for mounting the shaking device on a harvesting apparatus;

a carrier for at least one shaking member, which is displaceable relative to the mounting frame in order to be able to perform a vibrating movement relative to the mounting frame, and at least one shaking member which is attached to the carrier and can be arranged alongside branches of the plant in order to shake the plant by transmitting the vibrating movement to the branches, characterized in that the shaking device comprises:

a first motor and a first mass connected to the first motor, wherein the first motor is configured to drive the first mass rotatingly in a first rotation direction;

a second motor and a second mass connected to the second motor, wherein the second motor is configured to drive the second mass rotatingly in a second rotation direction opposite to the first rotation direction; and a transmission between the first motor and the second motor for coupling rotation of the first motor to rotation of the second motor, wherein the first motor and the second motor are connected to the carrier and wherein the first and the second mass are each mounted eccentrically on a respective rotation shaft so as to cause during rotation a vibrating movement and transmit it to the carrier, and wherein the first and the second motor are arranged on a side of the carrier directed toward the mounting frame.

14. A harvesting apparatus for harvesting fruit hanging from a plant, comprising at least one shaking device according to claim 1 and a catching device for catching fruit falling from the plant due to shaking of the plant by means of the at least one shaking device.

15. The harvesting apparatus according to claim 14, comprising two of said shaking devices, the carriers of which are disposed substantially parallel to each other.

16. The harvesting apparatus according to claim 14, which is mobile in a direction of travel.

17. The harvesting apparatus according to claim 16, wherein the at least one shaking device is placed in the center of the harvesting apparatus, as seen in the direction of travel.

18. The harvesting apparatus according to claim 16, wherein the harvesting apparatus comprises a frame for mounting the shaking device thereon, and wherein the at least one shaking device is displaceable relative to the frame in a direction transversely of the direction of travel.

* * * * *